June 10, 1958
K. B. COFER
2,838,574
CONTINUOUS HYDROLYSIS OF EPICHLOROHYDRIN
Filed June 7, 1954
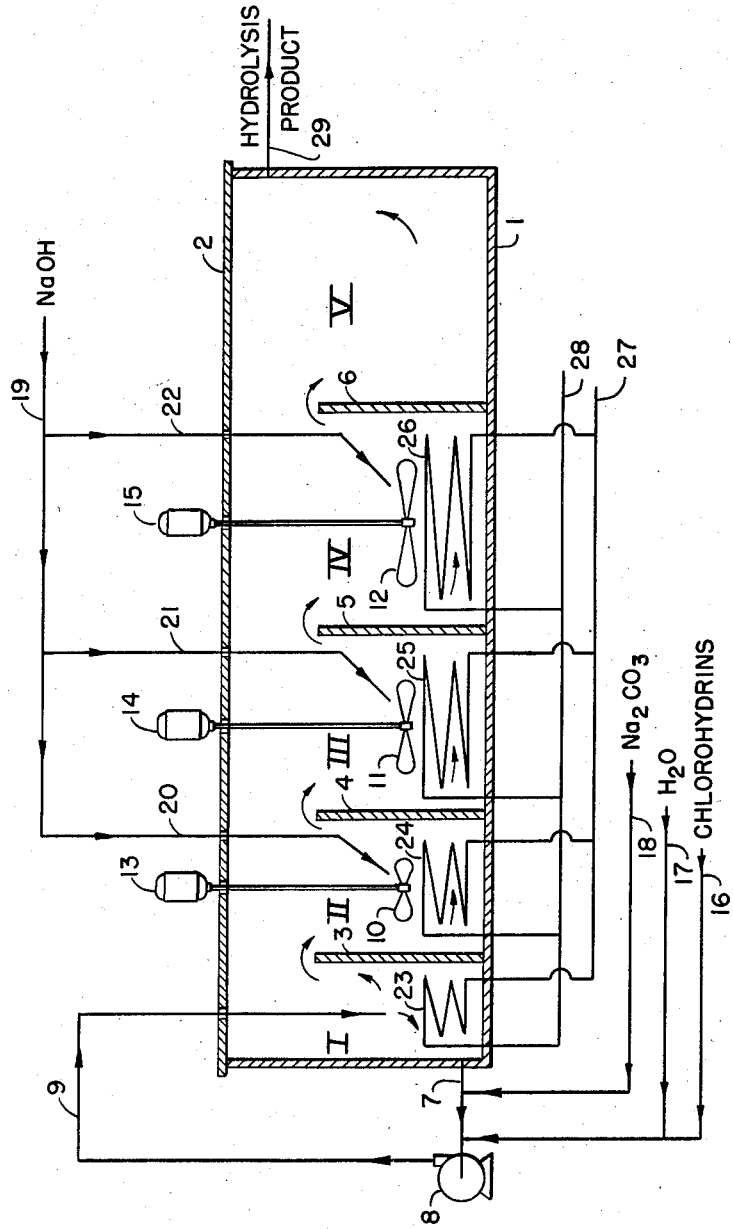
INVENTOR
KENNETH B. COFER
BY Millard L. Caldwell
HIS ATTORNEY United States Patent Office 2,838,574
Patented June 10, 1958

2,838,574

CONTINUOUS HYDROLYSIS OF EPICHLOROHYDRIN

Kenneth B. Cofer Pasadena, Tex., assignor to Shell Development Company, New York, N. Y., a corporation of Delaware Application June 7, 1954, Serial No. 434,715

2 Claims. (Cl. 260—635)

This invention relates to the production of polyhydroxy compounds by reaction of halohydrins, that is, hydroxyhalo compounds and/or epoxyhalo compounds, with aqueous basic solutions. It is especially concerned with a method for carrying out such hydrolyses continuously in the most efficient manner.

Hydrolysis of compounds containing a halogen atom or atoms and a hydroxy or epoxy group or groups attached to different aliphatic carbon atoms by reaction with an aqueous solution of a basic agent is a general method for producing the corresponding polyhydroxy organic compounds having —OH substituted for halogen and two —OH groups in place of the epoxy groups. The method has been especially useful in the production of glycols from halohydrination products of olefins. It is used on a large scale in the synthesis of glycerine. As heretofore carried out, however, the process suffers from a number of disadvantages, particularly in continuous methods of operations. Undesirably large amounts of high boiling products, usually referred to as polymers, are produced. Reactors of large volume have been required in order to achieve commercially practical throughput rates. Consumption of reagents has been high.

The present invention provides a commercially practical method for avoiding these disadvantages of the prior halohydrin hydrolysis procedures. It has as an important object the provision of a continuous method of hydrolyzing halohydrins and/or epihalohydrins with minimized formation of by-products. Another object is to provide a process in which more efficient utilization of the hydrolyzer volume is feasible and higher conversions of halohydrins per volume of reactor space can be obtained. Still another object is to reduce the consumption of basic agent in the continuous hydrolysis of halohydrins. Further objects and advantages of the invention will be apparent from the following description in which the application of the new process to the production of glycerine from glycerine chlorohydrins will be emphasized because of its special importance.

It has been found that these advantages can be realized by carrying out the hydrolysis of halohydrins in a plurality of reaction zones though which an aqueous stream containing the halohydrin or a mixture of halohydrins is passed in series, introducing a substantial part of the total stoichiometric requirement of basic agent for the hydrolysis into the first stage with the halohydrin feed, and feeding additional amounts of basic agent separately into one or more of the later reaction stages in amounts sufficient to maintain the hydrogen ion concentration at a pH value between about 8 and about 10, more preferably between about 8.5 and about 9.5. In this method of operation, it is most desirable that the reaction mixture move positively from stage to stage of the series of reaction zones without backmixing of mixture from a later stage of reaction with that in an earlier stage.

The desirability of controlling the alkalinity during hydrolysis of halohydrins has been recognized. U. S. Patent 2,318,032 of Van de Griendt, Marple and Peters, for example, claims an especially advantageous method of hydrolysis in which the alkalinity is maintained within the carbonate-bicarbonate range or at an equivalent pH by addition of a suitable buffer, for instance, sodium carbonate. At the optimum pH range for hydrolysis the buffer is only partly consumed in the reaction. The unused buffer not only represents a direct loss of base but also must be neutralized with acid which is an added expense and complicates product recovery by increasing the amount of salt which must be removed therefrom. To minimize the amount of buffering agent required, backmixing of the reacted mixture with the incoming feed of halohydrins and base has been used. This gives satisfactory pH control but introduces other disadvantages. Backmixing leads to a residence time distribution of the reactants in the system such that a part of reactant molecules must be given a longer residence time than would otherwise be required to reach the desired conversion. As a consequence, the reactor system must be larger than is necessary where positive flow without backmixing is employed and the cost of the apparatus is correspondingly increased. The present process avoids this and still provides efficient utilization of the basic agents in the reaction.

An even more important advantage of the new method is the improvement in yield which it provides by suppressing undesirable side reactions leading to higher boiling by-products. It has been discovered that these by-products are chiefly the result of interaction of the polyhydroxy product with epoxy intermediates formed in the normal course of the hydrolysis. By staged reaction of a flowing stream of the aqueous reaction mixture without backmixing between stages, the opportunity for product polyol to contact the intermediates is minimized and formation of higher boiling by-products is reduced.

The reaction can be carried out in a variety of ways. Since the halohydrins used as starting materials generally have a relatively low solubility in water, it is desirable to provide intimate mixing of the phases of the reaction mixture. One modification of the invention in which mechanical mixing means in each of the stages is used to maintain the halohydrins and intermediate reaction products uniformly dispersed in the aqueous phase of the reaction mixture throughout the reaction is illustrated in the attached drawing in which a suitable apparatus is shown diagrammatically in longitudinal section. In the drawing, which is not to scale, 1 represents generally an elongated, rectangular reaction vessel having a removable cover 2. The reactor is divided by vertical baffles 3, 4, 5 and 6 into five compartments, numbered in the drawing by Roman numerals I, II, III, IV and V. A drawoff line 7 near the bottom of the first reaction stage, I, is connected to a centrifugal pump 8 which circulates reaction mixture in the first stage via line 9. Reaction stages II, III and IV are provided with propeller mixers 10, 11 and 12 operated by motors 13, 14 and 15. These mixers keep the contents of these stages uniformly distributed as the mixture flows from stage to stage by way of weirs, not shown, in the baffles 3, 4, 5 and 6. Halohydrin feed, indicated in the drawing as being the preferred chlorohydrins, is supplied by line 16 together with water which may be initially present with the halohydrins and/or may be added by line 17. The aqueous halohydrin mixture is supplied to line 7 feeding into the suction of pump 8. A basic agent, preferably having buffer properties, indicated in the drawing as being sodium carbonate, is introduced by line 18 into the circulating reaction mixture flowing in line 7. Further base, for instance, a strong inorganic hydroxide such as the sodium hydroxide indicated in the drawing, is supplied by line 19 and introduced through lines 20, 21, and 22 into reaction zones II, III and IV, respectively, at controlled rates of flow regulated so as to maintain the pH therein within the previously mentioned range of about 8.5 to about 9.5. The reaction mixture as it flows through the successive reaction zones is maintained at hydrolysis temperature by heating means which may, for example, be heating coils 23, 24, 25 and 26 connected with headers 27 and 28 and heated by steam or other suitable heating medium. The final reaction stage V may be an unheated time tank as shown or can be provided with heating means and/or mixing means and a source of basic agent as in stages II, III and IV. After passage through the reaction zones in series, the reacted mixture is withdrawn from the reactor by line 29 for recovery of the polyhydroxy product.

When using this form of apparatus, it is advantageous to space the baffles 3, 4, 5 and 6 within reactor 1 so as to provide stages of progressively increasing size and consequently increasing residence time for the reaction mixture as it flows through the reaction zones. A suitable arrangement is one which provides residence times in stages II and III which are about 1½ to 2½ and about 3 to 5 times, respectively, that used in stage I. Later stages can have residence times of the same general order as stage III. The overall residence time required to reach a given conversion is usually appreciably lower in the staged system than that necessary in the conventional method of operation. For example, it was found that the hydrolysis of epichlorohydrin to glycerine was 90% complete in 60 minutes in the staged hydrolyzer shown in the drawing, whereas two hours were required in the conventional backmixing system to effect a comparable reaction under the same conditions of temperature and concentrations of reactants.

The reaction conditions can be varied in the process. Reaction time and temperature are reciprocal variables, the time for a given conversion decreasing as the temperature is increased. Temperatures in the range of about 75° C. to about 250° C. are generally suitable. Substantially complete conversions of the halohydrins are obtainable under these conditions at residence times in the reactor of about 4 hours to about 5 minutes or less. Residence time as here referred to is the liquid volume of reaction mixture in the reactor, for example, in gallons divided by the total rate of feed to the reactor in gallons per minutes. The preferred temperature range for hydrolysis of the glycerine chlorohydrins, that is, epichlorohydrin, and the mono- and di-chlorohydrins is about 100° to 200° C. When temperatures of about 75° C. to about 110° C. are used, the reaction can be carried out under ordinary pressure and the reactor can advantageously be constructed of wood or the like. In operations at higher temperatures, it is preferred to conduct the reaction under superatmospheric pressure, most preferably carbon dioxide pressure since this appears to exert a favorable influence on the reaction. Pressures up to 500 p. s. i. g. or more can be used.

When using elevated pressure for the hydrolysis it is usually desirable to employ separate reaction vessels for each of the reaction stages since construction of the apparatus is thus simplified. Alternatively, the apparatus, whether used at high or low pressure, can be an elongated pipe or coil, into one end of which the initial feed of halohydrin, water and base is injected, preferably through a mixing nozzle, at a rate which will insure turbulent flow sufficient to insure the desired intimate contact of the reactants. Additional base is then introduced at a plurality of points along the path of flow of the reaction mixture. The reactor volume from point to point of such injection of base constitutes the different reaction stages in series in this case. This form of apparatus is especially useful for high temperature, high pressure reaction at very short residence times. Heating is conveniently carried out by means of an external jacket through which steam, hot oil or other suitable medium is circulated, preferably countercurrent to the flow of reaction mixture in the pipe reactor. In any form of apparatus used for staged hydrolysis of halohydrins in accordance with the invention there are advantages in controlling the temperature in the different reaction stages so as to provide a gradual rise in temperature as the reaction progresses. An increase in temperature of about 10–50° C. between the first and final reaction stages gives good results.

The reaction is preferably carried out with an amount of total base at least equal to, and preferably in at least a small excess over, the stoichiometric requirement of one equivalent per equivalent of halogen in the starting halohydrin. Generally, about 2% to 15% excess of basic agent is used. This amount of total base is divided between the different reaction stages in the proportions required to maintain the required pH therein. Since the initial stages of reaction are more rapid than the later stages, it is usually desirable to add most of the basic agent in the first two stages. Thus, for example, in the preferred method of operation using three or more reaction stages in which base is added, it is preferred to introduce about 20% to about 30% of the stoichiometric requirement of basic agent for the hydrolysis in the first reaction stage and about 20% to about 30% in the second stage. The remaining base is then added to the third stage or divided between the third and later stages.

As basic agents, one can successfully use basic metal hydroxides, the alkali metal hydroxides such as sodium, potassium and lithium hydroxides being especially suitable. Alkaline earth metal hydroxides can also be used although their lower solubility in the reaction medium is usually a disadvantage. It is desirable to carry the reaction out in all stages in the presence of a buffer salt which will aid in maintaining the desired pH. Any salt of a strong base with a weak acid, for instance, the alkali metal carbonates, phosphates, polyphosphates, borates and the like, can be used. Carbonate salts are especially useful not only because of their advantageous buffer action but also because the carbonate ions seem to exert a beneficial effect upon the hydrolysis independent of their pH effect. Sodium carbonate and bicarbonate are especially useful because of their low cost. For these reasons, it is preferred to maintain carbonate and/or bicarbonate ions in the reaction mixture throughout the reaction. This can be accomplished advantageously by feeding sufficient carbonate and/or bicarbonate to the first reaction stage, with or without a hydroxide, to insure the presence of these ions therein, and adding hydroxide (preferably corresponding to the carbonate salt used in the first stage) in the later hydrolysis stages as required to maintain the pH of the mixture within the range of about 8.5 to about 9.5 throughout the reaction. The basic agents used are preferably supplied to the reaction in the form of aqueous solutions but may be added as slurry or powder. A considerable excess of water should be present in the reaction mixture, and it has been found most advantageous as a rule to use proportions such as correspond to a concentration of polyhydroxy product in the completely hydrolyzed mixture of about 3% to about 35% by weight. In general, the degree of yield improvement obtainable by staged reaction increases with the concentration of halohydrin in the initial reaction stage. The new method makes it feasible to operate at high concentrations which cannot be used in other methods without excessive loss of product.

The following examples illustrate in more detail the operation of the new process in one of its advantageous modifications.

*Example I*

Epichlorohydrin containing about 25% by weight of dichlorohydrins was hydrolyzed in a wooden reaction vessel divided into five compartments as shown in the drawing. A centrifugal pump circulated only the solution in the first compartment. The remaining compartments were agitated by propeller mixers. Into the suction of the circulating pump dilute chlorohydrins feed and 20% sodium carbonate solution were injected. Sodium hydroxide of 45% by weight concentration was admitted into the second, third, and fourth compartments of the vessel to maintain the desired pH of the reaction mixture. A reaction temperature of 202–205° F. and a residence time of two and one-half hours were maintained. As determined by carbonate and bicarbonate determinations, a buffer level of 0.08 millimoles of sodium carbonate per gram of reactor effluent was maintained.

The dilute glycerine product was concentrated by flashing the water overhead at 1–2 mm. Hg absolute pressure to 100° C. Anhydrous isopropyl alcohol was then added to the concentrate, and excess salt was filtered from the mixture. After the alcohol was removed by flashing at 1–2 mm. Hg absolute pressure to 100° C., the partially salt-free concentrate was then analyzed for glycerine, salt, sodium carbonate, sodium bicarbonate and water, and the polymer production was determined.

The method gave a 40–60% reduction in the amount of polymer formed compared to reaction under identical conditions of temperature, residence time, buffer level, pH and epichlorohydrin concentrations using continuous injection of the reactants into a circulating stream of reaction mixture without staged reaction.

| Method of Hydrolysis | Concentration of Procursors (Percent by Weight) | pH of Reaction Mixture | Polymer Formation, Percent by Weight |
| --- | --- | --- | --- |
| Single stage | 5.0 | 9.6 | 6.5 |
| Multi stage | 5.0 | 9.6 | 3.8 |
| Single stage | 4.4 | 8.9 | 5.7 |
| Multi stage | 4.5 | 8.9 | 2.3 |

Similar results are obtained when glycerine dichlorohydrin and monochlorohydrin are used in place of epichlorohydrin in the foregoing process.

*Example II*

The rapid rate of reaction which can be obtained by staged hydrolysis is shown by the following figures for reaction of aqueous epichlorohydrin of 5.05% concentration with sodium carbonate and hydroxide in five reaction stages as described in Example I. The reaction temperature was 202° to 205° F. in all stages.

| Reaction Stage | Total Residence Time (Minutes) | Epichlorohydrin in Reaction Mixture (Percent by Weight) | Other Glycerine Precursors (Percent by Weight) | Glycerine, Percent by Weight |
| --- | --- | --- | --- | --- |
| I | 12 | 4.61 | 0.03 | 0.52 |
| II | 32 | 0.81 | 0.79 | 3.26 |
| III | 82 | 0.12 | 0.19 | 4.77 |
| IV | 136 | 0.05 | 0.03 | 4.99 |
| V | 172 | 0.04 | 0.01 | 5.00 |

*Example III*

By the method of Example I, equally good results are obtained in the hydrolysis of 1-chloro-2,3-epoxybutane to 1,2,3-trihydroxybutane and of beta-methyl epichlorohydrin to beta-methyl glycerine.

The new process is generally applicable to the hydrolysis of halohydrins and epihalohydrins as a class to the corresponding polyhydroxy compounds. It is especially advantageous in the hydrolysis of alpha-halohydrins, that is, halohydrins which have a halogen atom linked to a carbon atom to which a hydroxy- or epoxy-substituted carbon atom is directly attached. These alpha-halohydrins offer special difficulty in hydrolysis because of their greater proneness to form undesirable by-products. Typical halohydrins which can be successfully hydrolyzed by the staged method of reaction are, for example, aliphatic epoxyhalides such as glycerine epibromohydrin, 1-chloro-3,4-epoxybutane, 1-chloro-2,3-epoxypentane, 2-chloro-3,4-epoxypentane, 3-chloro-4,5-epoxydecane, 3-chloro-1,2-epoxydodecane and hydroxy and/or halo-substitution products thereof, as, for instance, 2-(chloromethyl)-1-hydroxy-2,3-epoxypropane; 1,2-dichloro-3,4-epoxybutane, and the like. Corresponding hydroxy halides can be used in exactly the same way. Thus, ethylene and propylene glycol are produced from ethylene and propylene chlorohydrin, alpha-methyl glycerol is produced from 1-chloro-2,3-dihydroxybutane or 2-chloro-1,3-dihydroxybutane, and beta-methyl glycerine is obtained when 1-chloro-2-methyl-2,3-dihydroxypropane is hydrolyzed as described in Example I. 1-bromo-3,4-dihydroxypentane gives 1,3,4-trihydroxypentane and 3,4,5-trihydroxydecane is obtained in good yield from 3,4-dihydroxy-5-chlorodecane. The starting halohydrin can contain aromatic substituents and can be an alicyclic compound.

Still other variations can be made in the process of the invention which is not limited to the examples which have been given by way of illustration nor by any theory proposed in explanation of the improved results which are obtained.

I claim as my invention:

1. A process for producing glycerine which comprises continuously feeding a liquid stream containing glycerine epichlorohydrin and water through a plurality of reaction zones in series maintained at a temperature of about 100° to 200° C. at which hydrolysis takes place, adding alkali metal carbonate to the feed to the first of said reaction zones in an amount about 20% to about 30% of the stoichiometric requirement of base for the hydrolysis, separately feeding alkali metal hydroxide into each of a plurality of succeeding reaction zones of progressively increasing residence periods in an amount to maintain the pH of the reaction mixture in the range of about 8.5 to about 9.5 throughout the reaction, and completing the reaction in a final reaction zone without added base, the flow of said mixture through said zones being arranged so that reaction product from a later zone is not present in an earlier reaction zone of the series whereby reduced consumption of base in the process is obtained.

2. A process in accordance with claim 1 wherein the residence period of the mixture between the points of introduction of base is controlled so that the time in the second zone is about 1½ to about 2½ times that in the first zone and the residence time in the third zone is about 3 to 5 times that in the first zone.

References Cited in the file of this patent

UNITED STATES PATENTS

| | | |
| --- | --- | --- |
| 1,695,250 | Curme | Dec. 11, 1928 |
| 1,895,517 | Lewis | Jan. 31, 1933 |
| 2,318,032 | Van de Griendt et al. | May 4, 1943 |
| 2,605,293 | Tymstra | July 29, 1952 |

FOREIGN PATENTS

| | | |
| --- | --- | --- |
| 684,763 | Great Britain | Dec. 24, 1952 |

OTHER REFERENCES

Brooks: Chemical and Met. Eng., vol. 22 (1920), p. 633.